United States Patent
Morgan et al.

(10) Patent No.: US 7,435,439 B2
(45) Date of Patent: Oct. 14, 2008

(54) EDIBLE TEMPORARY TATTOOS

(76) Inventors: Jeanie Morgan, 335 N. Ft. Thomas Ave., Ft. Thomas, KY (US) 41075; John Schaffstein, 410 Morris Rd., Ft. Wright, KY (US) 41011

( * ) Notice: Subject to any disclaimer, the term of this patent is extended or adjusted under 35 U.S.C. 154(b) by 655 days.

(21) Appl. No.: 10/377,973

(22) Filed: Nov. 27, 2002

(65) Prior Publication Data
US 2003/0215593 A1 Nov. 20, 2003

Related U.S. Application Data

(60) Provisional application No. 60/333,455, filed on Nov. 27, 2001.

(51) Int. Cl.
*A22C 13/00* (2006.01)
*A23G 3/00* (2006.01)
*A21D 13/00* (2006.01)

(52) U.S. Cl. .......................... 426/383; 426/87; 426/90; 426/104; 426/132; 426/138; 426/274; 426/534; 426/548; 426/660; 428/195.1; 428/40.1; 428/411.1

(58) Field of Classification Search .............. 428/195.1, 428/914, 90.1, 41.6, 41.8, 42.1, 42.2, 42.3, 428/411.1, 41.1; 426/87, 103, 104, 138, 426/805, 383, 302, 806, 90, 132, 548, 274, 426/534, 600
See application file for complete search history.

(56) References Cited

U.S. PATENT DOCUMENTS

| | | | | |
|---|---|---|---|---|
| 4,522,864 A | | 6/1985 | Humason et al. ............ 428/201 |
| 4,531,292 A | * | 7/1985 | Pasternak .................... 33/18.1 |
| 5,017,394 A | * | 5/1991 | Macpherson et al. ........ 426/302 |
| 5,505,775 A | * | 4/1996 | Kitos ........................... 118/14 |
| 5,578,353 A | * | 11/1996 | Drew, III ..................... 428/43 |
| 5,620,757 A | * | 4/1997 | Ninomiya et al. .......... 428/34.8 |
| 5,676,401 A | * | 10/1997 | Witkowski et al. ............ 283/81 |
| 5,702,740 A | * | 12/1997 | Wild ............................ 426/87 |
| 5,800,601 A | * | 9/1998 | Zou et al. ................. 106/31.65 |
| 5,817,385 A | | 10/1998 | Stanislav .................... 428/40.2 |
| 5,834,047 A | * | 11/1998 | Ahn ............................ 426/383 |
| 5,895,682 A | * | 4/1999 | Tsukioka .................... 426/383 |
| 5,958,560 A | * | 9/1999 | Ewan ....................... 428/32.24 |
| 6,013,122 A | * | 1/2000 | Klitzman et al. ......... 106/31.03 |
| 6,042,881 A | * | 3/2000 | Ewan ......................... 427/152 |
| 6,074,721 A | | 6/2000 | Moore et al. ................ 428/42.1 |
| 6,106,852 A | * | 8/2000 | Vineberg .................... 424/402 |
| 6,355,285 B1 | * | 3/2002 | Hoy ............................ 426/87 |
| 6,457,585 B1 | | 10/2002 | Huffer et al. ............. 206/459.5 |
| 6,485,575 B2 | * | 11/2002 | Yuan ........................... 127/71 |
| 6,594,927 B2 | * | 7/2003 | Witkowski ................... 40/310 |
| 6,616,958 B1 | * | 9/2003 | Stewart ....................... 426/383 |
| 6,672,254 B1 | * | 1/2004 | Butts .......................... 119/711 |
| 2004/0017836 A1 | * | 1/2004 | Buda et al. .................... 372/45 |
| 2004/0043134 A1 | * | 3/2004 | Corriveau et al. ........... 426/658 |

\* cited by examiner

*Primary Examiner*—Milton I. Cano
*Assistant Examiner*—Camie S Thompson

(57) ABSTRACT

An ink-based image is releasably printed onto a substrate for transferring to the skin. Flavoring is incorporated with the ink-based image, yielding a selected scent and taste. Unlike generally known candy flavored appliques, the flavored ink tattoo has a long shelf life, achieves an intense flavor, and has a wide range of taste selections.

15 Claims, 5 Drawing Sheets

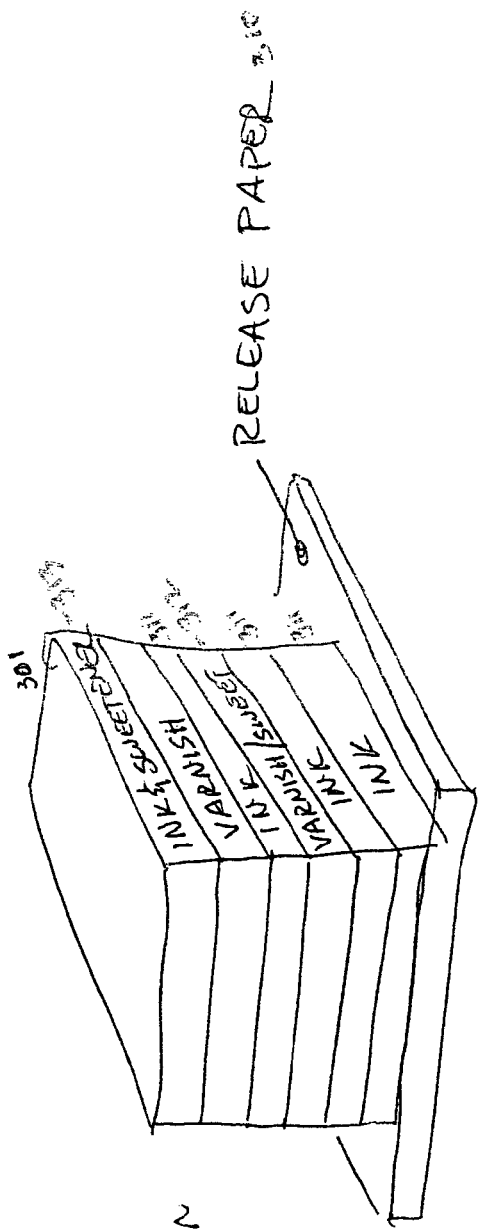
Fig. 4 CROSS SECTION
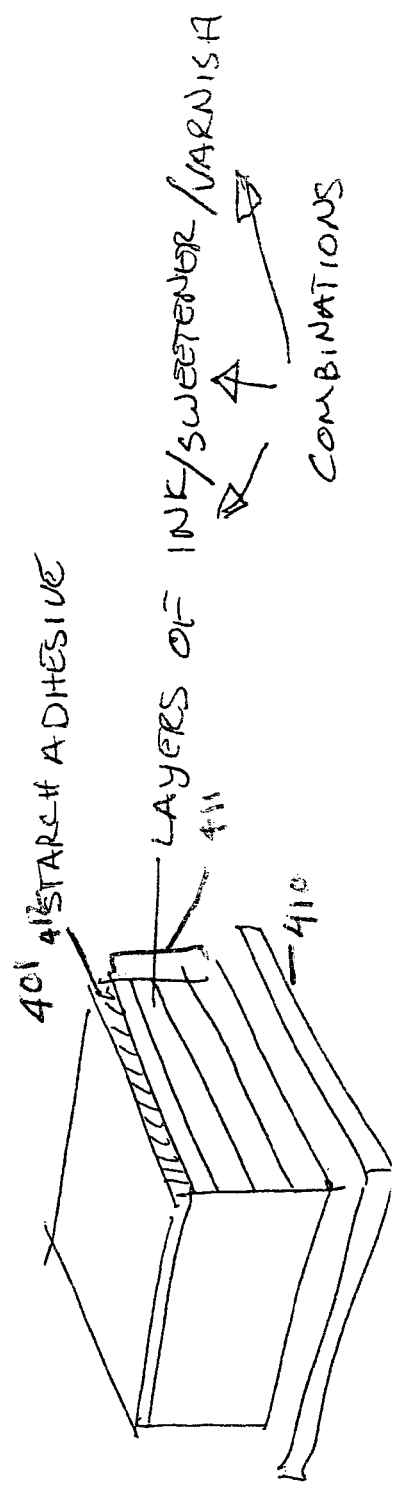
FIG. 5

FIGURE V

EDIBLE TEMPORARY TATTOOS

CROSS REFERENCE TO RELATED APPLICATIONS

The present application hereby claims the benefit of the provisional patent application of the same title, Ser. No. 60/333,455, filed on Nov. 27, 2001.

FIELD OF THE INVENTION

The present invention relates to temporary tattoos, and in particular edible temporary tattoos with flavoring.

BACKGROUND OF THE INVENTION

Temporary tattoos have been utilized for many years as decorative Appliqués to the skin. Suitable technologies for the manufacture of such decal tattoos exist in many variations, which can be seen, for example, in U.S. Pat. No. 6,074,721 issued to Moore, U.S. Pat. No. 4,522,864 issued to Humason and others. The aforementioned patents provide detailed technical variations that provide for simplicity and quality in the manufacturing of temporary tattoos. Traditional temporary tattoos are intended to be used as a temporary visual aesthetic adornment. Temporary tattoos have also added the use of scent as shown, for example, by U.S. Pat. No. 5,817,385 issued to Stanislav, which discloses the use of a scented tattoo for the purpose of perfume sampling. Temporary tattoos have also been used for medicinal purposes.

Flavored tattoos have been developed, but use a starch-based product (e.g., sugar) as a transferring agent, which leaves a sticky residue. Further, the previous flavored temporary tattoos with the transferring agent of candy materials decompose rapidly, making the shelf life of the product limited. Moreover, the range of flavors appropriate for incorporation into such a starchy, candy-like transferring agent are limited, relegating such products to niche, novelty markets.

Consequently, a significant need exists for a temporary tattoo that creates a wide range of images and has an improved approach to incorporating flavoring.

SUMMARY OF THE INVENTION

The present invention addresses these and other problems in the prior art by providing temporary, ink-based tattoo that includes an associated flavoring. Thereby, temporary tattoo may take advantage of the wide range of colors achievable by one or more layers of ink. Moreover, since the flavoring is associated with the ink, there is no need for a candy-like transfer layer (e.g., sucrose, fructose, chocolate, etc.) to carry the flavor. Thereby, shelf-life limitations of such transfer layers are also avoided. Moreover, the range of flavors that may be selected is greatly expanded beyond those suitable for incorporation into a candy-like transfer layer.

In one aspect of the invention, an a temporary edible flavored tattoo comprising a release substrate onto which a desired image is applied with a non-toxic edible ink, wherein the temporary tattoo is associated with a flavoring by being infused prior to being applied to the substrate. For instance, the flavoring may be comprised of at least one, or all three of a sweetener, flavoring, or citric acid.

In another aspect of the invention, a temporary edible tattoo has a layer of edible ink and/or varnish on the substrate dusted with a flavoring in the form of a powder, with the combination thereafter dried. The powder may contain at least one, or all three of a sweetener, flavoring, and a carrier. The powered form of flavoring yields an intense burst of flavor yet still retains the advantages of being associated with the edible ink.

The aforementioned aspects of the invention allowed a flavored tattoo to be used in new applications. For example, in the sales promotion industry, taste testing of food products is traditional, which generally requires a trained representative to be present for the distribution and sampling of promotional food items. Because the promotional representative is required to prepare and distribute the promotional samples, the number of potential customers who may benefit to the taste testing is quite limited to a limited number of locations and to a limited number of product selections.

It will be appreciated that the high fidelity of imaging and intense flavor of the present invention allow for conveying the look and taste of a wide variety of food products such as for comparison or taste sampling. For instance, the sampling of various breakfast cereals, flavored drinks, or confections could, with the present invention, be handled through a packet of temporary tattoos. Moreover, with its resilient nature and long shelf-life, such packets may be incorporated with other products or direct mailings without risk of degradation to the flavoring.

These and other objects and advantages of the present invention shall be made apparent from the accompanying drawings and the description thereof.

BRIEF DESCRIPTION OF THE FIGURES

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 4 is a cross-sectional view of a temporary tattoo.

FIG. 5 is a cross-sectional view of a temporary tattoo utilizing a silkscreen printing process to apply the desired image.

DETAILED DESCRIPTION OF THE INVENTION

Figure 1:
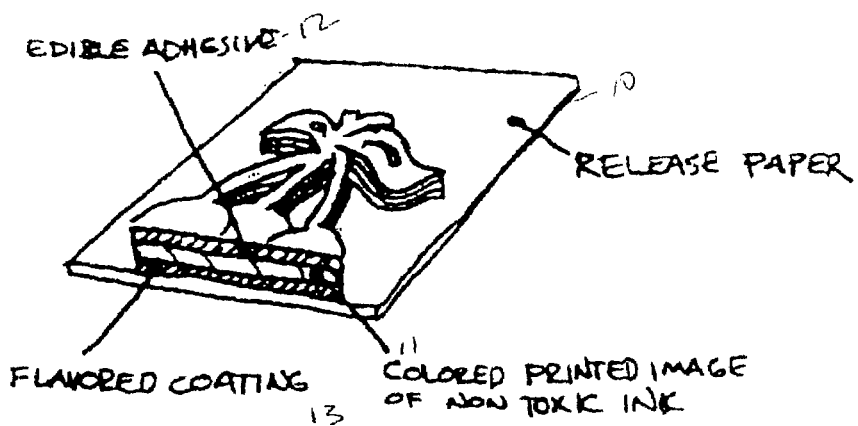
FIG. 1 depicts a temporary tattoo where a transparent flavored coating is applied.

One embodiment of the temporary edible favored tattoo of the present invention is depicted in FIG. 1. The temporary tattoo comprises a release substrate 10 onto which a desired image 11 is applied. The release substrate can be any flexible material known in the art to which an image can be appropriately applied utilizing a non-toxic edible ink. A preferred release substrate material is paper. A desired image is applied to the release substrate utilizing any method of ink application known in the art. The image can be comprised of one image, or a plurality of images. The image can be anything desired by the wearer and is generally in conformance with the type of images found in tattoos, for example, letters, words, or illustrations. An image, for example can be printed onto the release substrate 10, or can be applied using a silk screen printing method. Alternatively, the image can be applied utilizing an offset printer. In one embodiment, an edible adhesive layer 12 is disposed on the surface of the temporary tattoo. A flavored coating layer 13 is further applied to the tattoo.

Figure 2:
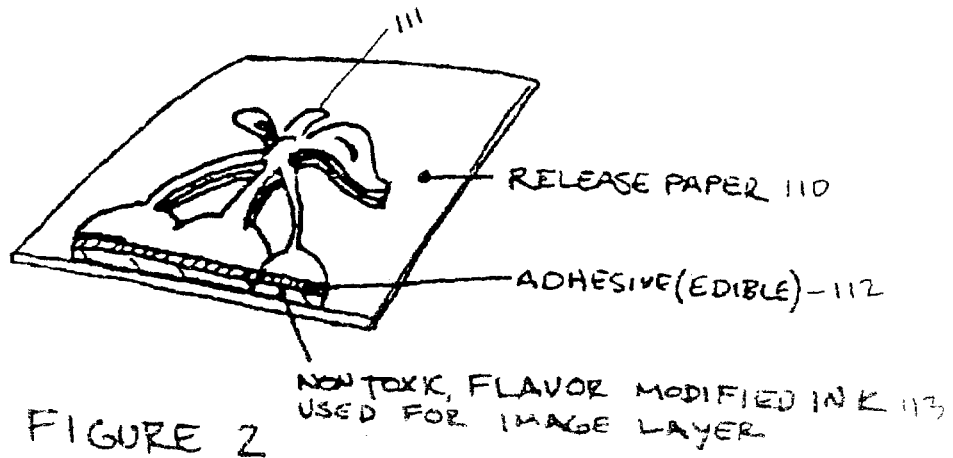
FIG. 2 depicts a temporary tattoo wherein the non-toxic edible ink has been modified to include a flavoring.

Another embodiment of the present invention is depicted in FIG. 2. In this embodiment, an image 111 is applied to the release substrate 110 with modified non-toxic edible ink 113. An edible adhesive layer 112 is disposed on top of the ink layer 113. The edible adhesive 112 can be selected from any of those known in the art that are safe for human consumption.

The non-toxic edible ink 113 ink can be modified to contain a flavoring, or combinations of flavorings. Any non-toxic edible ink known in the art can be used. The ink is selected based on the required thickness, the number of ink layers being applied or any other desired qualities for the ink application. Also, any flavoring known in the art can be used. The flavoring or combinations of flavorings are selected based on the desired flavors, the type of ink used, and the release substrate material used. The modified non-toxic edible ink 113 can also be combined with pigments, flavoring components (for example, salt, citric acid, fruit flavorings, bitters or sweeteners, and carriers. Any pigment known in the art can be used. The pigment should be selected considering the type of ink used and the desired color. The sweetener, if used, may be either natural or synthetic, such as for example, sucrose, fructose, saccharin, aspartame, ACE-K, and others, as well as mixtures of those sweeteners. The sweetener should be selected based on the sweetener reaction and compatibility when mixed with individual flavorings. The carrier is selected based on the required characteristics of the ink, or other additives used. Examples of possible carriers are alcohol, water, and soy, among others known in the art.

Figure 3:
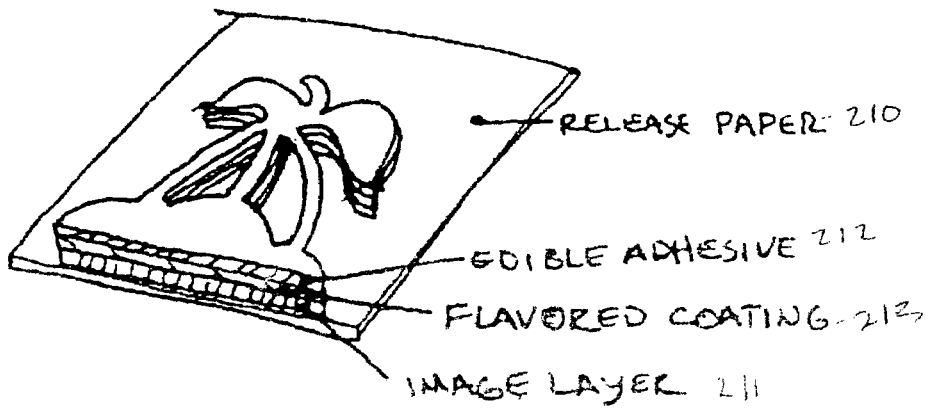
FIG. 3 depicts a temporary tattoo wherein a flavoring layer is disposed between an applied image and an edible adhesive layer.

A temporary tattoo as shown in FIG. 3 comprises a release substrate 210 onto which an image 211 is applied with a non-toxic edible ink. A flavored coating layer 213 is disposed between an image 211 and an edible adhesive layer 212. The flavored coating layer 213 can be applied by any method known in the art, but preferably by spot printing. Any flavoring or combinations of flavoring known in the art may be added to the flavored coating layer 213.

FIG. 4 depicts a cross-sectional view of a temporary tattoo. The temporary tattoo 301 comprises a release substrate 310 onto which layers of non-toxic edible ink 311 are applied. The non-toxic edible ink layers 311 may also contain a sweetener 313. A varnish coating 312 is further applied to the temporary edible tattoo by any method known in the art. The varnish coating 312 comprises a release agent and either one or a combination of sweetener and flavoring. If a combination of sweetener and flavoring is used, the combination is modified to optimize each flavor. The release agent in the varnish coating 312 can be selected from those known in the art.

A temporary tattoo made by silkscreen printing is generally depicted by FIG. 5. The temporary flavored edible tattoo 401 is comprised of a release substrate 410 onto which layers 411 of ink, sweetener and varnish, or combinations thereof are applied. A starch adhesive layer 412 is disposed on top of the layers 411 of ink, sweetener, and varnish. The starch adhesive layer can be applied by any method known in the art.

Figure 6:
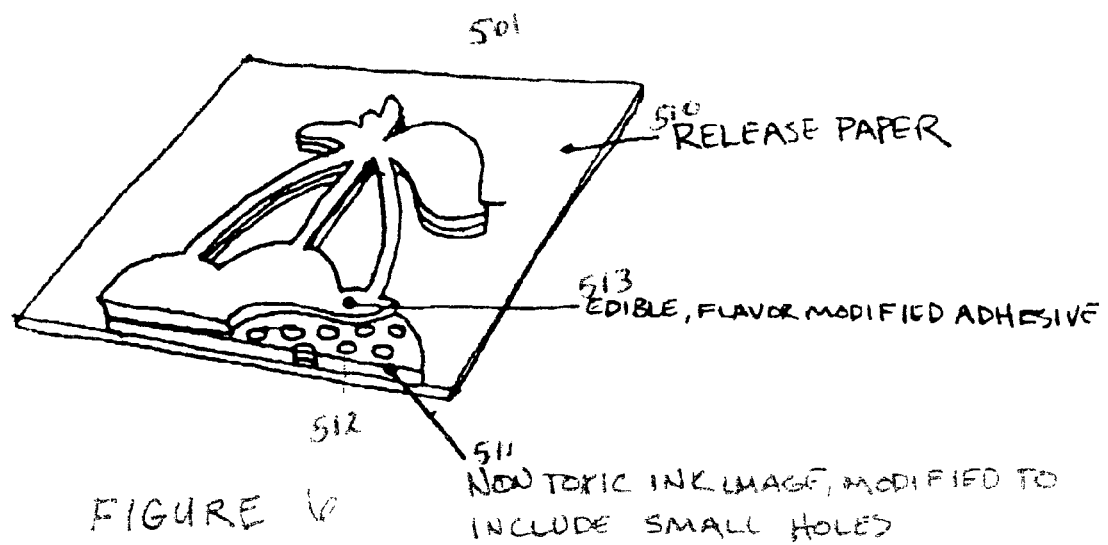
FIG. 6 depicts a temporary tattoo where the edible adhesive layer has been modified to include flavoring and the image of the tattoo has been graphically modified with microscopic holes which increases the porous quality of the ink layer and assures even distribution of flavoring.

In FIG. 6, the temporary tattoo 501 has been modified to be comprised of a release substrate 510 onto which at least one image is applied using non-toxic edible ink. In this embodiment of the invention, the ink is modified to include cavities 512. The cavities are preferably microscopic. These microscopic cavities increase the porous quality of the ink layer and assure even distribution of flavoring. The temporary tattoo can further contain a flavored edible adhesive layer 513. The adhesive layer 513 can be applied by any method known in the art.

The temporary edible flavored tattoo of the present invention can further comprise at least one layer of a flavored powder. The flavored powder is applied to the temporary tattoo by any method known in the art, preferably while the non-toxic edible ink or varnish is still wet. The ink and the powder are then dried together. The flavored powder can further contain at least one of a sweetener, flavoring, and citric acid. The addition of the sweetener, flavoring, and citric acid and the amounts used are selected based on the desired flavor qualities of the resulting flavored tattoo. By way of an illustrative example, the powder may contain a combination of the following ingredients: maltodextrin, gum arabic, N & A flavors, silicon dioxide, citric acid, sodium sacchrin, hydroxypropyl methylcellulose, deionized water, isopropyl alcohol, FD&C Yellow 5, FD&C blue 1, FD&C Red 3, and FD&C Red 40.

Figure 7:
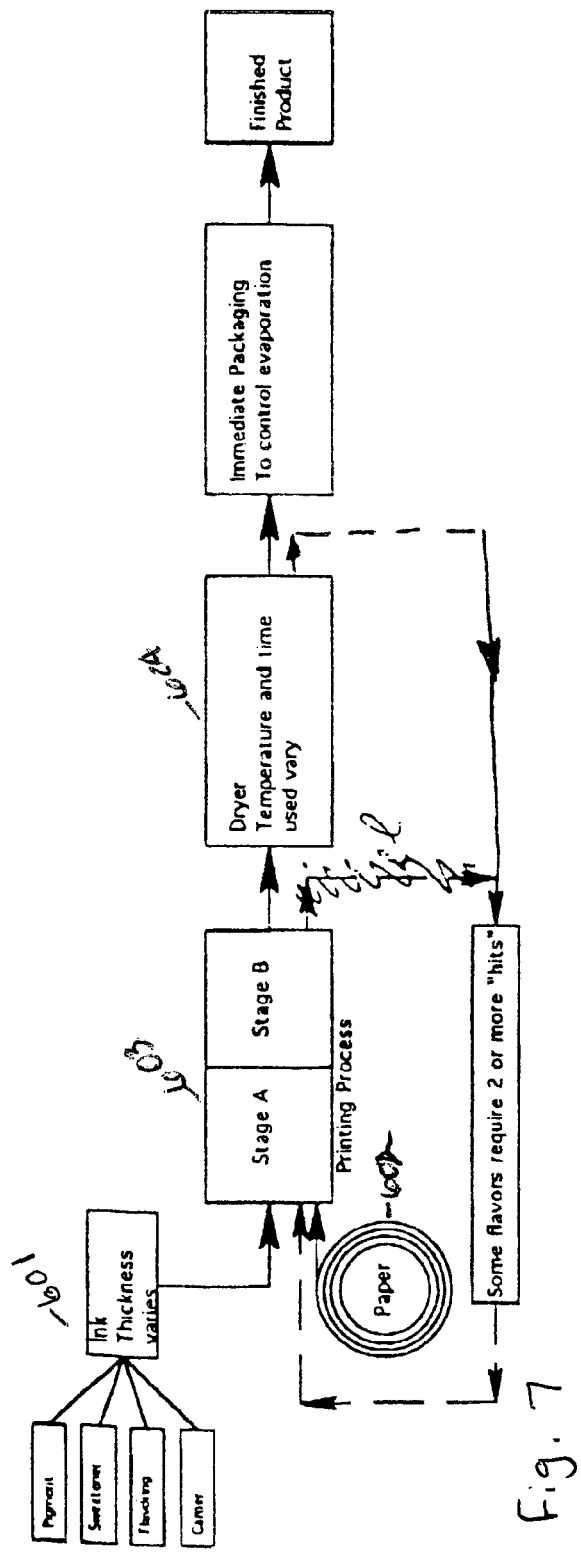
FIG. 7 depicts a method of manufacturing a temporary tattoo.

FIG. 7 generally depicts one preferred method of manufacturing the present invention. An image is applied by any method known in the art to a substrate 602 using non-toxic edible ink via a printing station 603. Previous to the application of the image to the substrate 602, the ink can be combined with pigments, carriers, sweetener, and/or flavorings. Once the image is applied, the ink is then dried using a dryer 604. Any dryer known in the art can be used including a heat or UV dryer. The temperature and length of the drying period can be selected based on the ink or other additives used, the number of ink layers used, or any other constraints known in the art. Alternatively, after the image has been applied, the substrate 602 travels through a dusting station where powdered flavor and/or appropriate sweetener is applied prior to drying. The ink layer and powder are then dried using the dryer 604 where the time, temperature, and type of dryer can be selected based on the ink type, number of ink layers, ink thickness, and the qualities the powder used.

Once the ink layer is dried, the substrate 602 is re-introduced to the printing station 603 where a varnish layer is applied to the previously printed image and powder layer if present. The varnish layer can be applied using any method known in the art. Once the varnish layer is applied, it is dried using the dryer 604. Any dryer known in the art can be used including a heat or UV dryer. The temperature and length of the drying period can be selected based on the varnish layer or any additives used, as well as any other constraints known in the art.

Any number of ink and varnish layers can be applied to the substrate. Further, different pigments and flavors can also be applied to the same substrate in order to achieve the desired image or taste. After the layers are added and dried, the tattoos are immediately packaged to avoid evaporation or product destruction. Any product packaging known in the art can be used.

Figure 8:
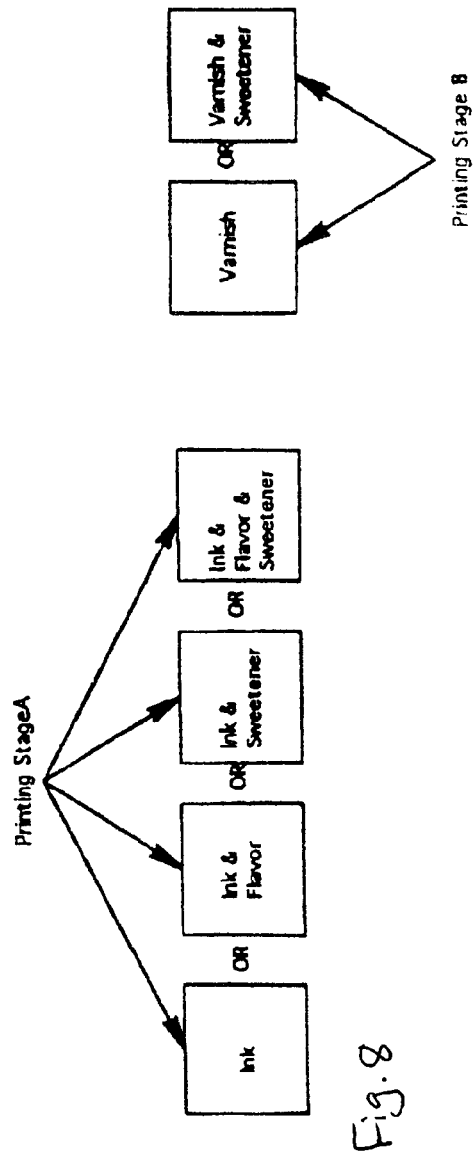
FIG. 8 depicts possible customization of a method of manufacturing within each stage of printing to create a temporary tattoo.

FIG. 8 depicts the various printing stages that can occur at the printing station. The printing station conducts at least two activities. One activity is illustrated as stage A and includes applying ink to the substrate to apply the image. The ink can include flavoring, sweetener, carriers, or any combinations thereof as required by the application. Another printing station activity relates to applying a varnish coating. The coating can contain varnish or varnish and a sweetener and/or flavoring as required for optimizing the overall flavoring of the temporary tattoo.

Figure 9:
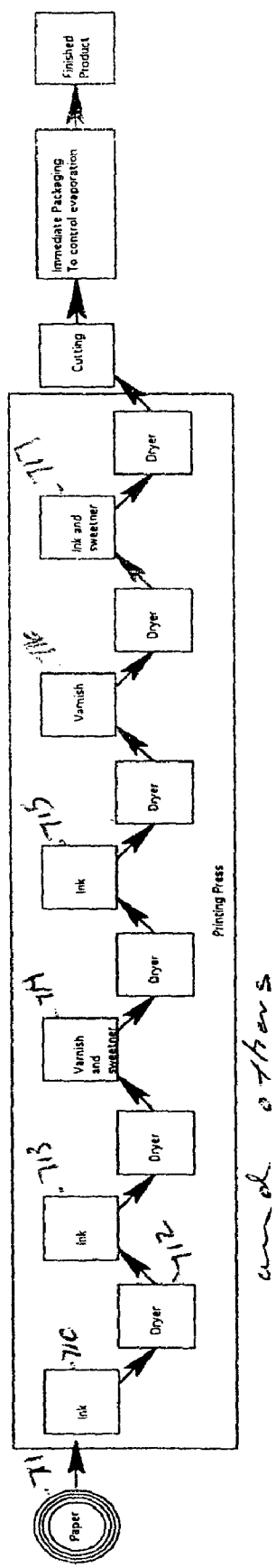
FIG. 9 depicts an illustrative method of manufacturing a four-colored flavored temporary edible tattoo.

FIG. 9 depicts an illustrative method of manufacturing a four color flavored temporary tattoo of the present invention. A first layer of ink 710 is applied to the substrate 711 and then dried using a dryer 712. Once the ink is dry, a second layer of ink 713 is added to the substrate. After the drying process by a 210 dryer 712, a varnish coating with sweetener 714 is applied and subsequently dried. On top of the second layer of ink 715, a varnish coating 716 without sweetener is added and then dried. A final layer of ink 717 with sweetener added is applied to the top of the previous varnish coating 716. The final ink layer 717 is dried using a dryer 712 and immediately packaged in order to prevent product evaporation or disintegration.

While the present invention has been illustrated by description of several embodiments and while the illustrative embodiments have been described in considerable detail, it is not the intention of the applicant to restrict or in any way limit the scope of the appended claims to such detail. Additional advantages and modifications may readily appear to those skilled in the art.

What is claimed is:

1. A temporary edible flavored tattoo comprising:
a release substrate;
at least one image made from non-toxic edible ink applied to said release substrate; and
an edible adhesive layer,
wherein said temporary edible tattoo further comprises a powder comprising at least one flavoring material, the powder being disposed on top of said non-toxic edible ink.

2. The temporary edible flavored tattoo of claim 1 wherein said flavoring material comprises a sweetener selected from the group consisting of fructose, sucrose, saccharin, aspartame, ACE-K, and mixtures thereof.

3. The temporary edible flavored tattoo of claim 1 wherein said non-toxic edible ink comprises at least one flavoring material.

4. The temporary edible tattoo of claim 1 further comprising a varnish.

5. The temporary edible favorable tattoo of claim 1 wherein said edible ink comprises a carrier selected from the group consisting of alcohol, water, soy and mixtures thereof.

6. A temporary edible flavored tattoo comprising:
a release substrate;
at least one image made from a non-toxic edible ink applied to said release substrate;
at least one layer of a powder on said imaged release substrate, wherein said powder comprises at least one flavoring material;
at least one layer of varnish on said release substrate;
at least one layer of edible adhesive on said varnish; and, optionally,
further comprising a non-powder flavoring.

7. The temporary edible flavored tattoo of claim 6 wherein said edible ink comprises the non-powder flavoring.

8. A temporary edible flavored tattoo comprising:
a release substrate; at least one image made from non-toxic edible ink applied to said release substrate,
wherein said temporary edible tattoo further comprises a powder comprising at least one flavoring material, wherein the flavoring material consists of a sweetener.

9. The temporary edible flavored tattoo of claim 8 wherein said sweetener is selected from the group consisting of fructose, sucrose, saccharin, aspartame, ACE-K, and mixtures thereof.

10. The temporary edible flavored tattoo of claim 8 wherein said powder is disposed on top of said non-toxic edible ink.

11. The temporary edible flavored tattoo of claim 8 wherein said non-toxic edible ink comprises said powder comprising at least one flavoring material.

12. The temporary edible flavored tattoo of claim 8 further comprising an edible adhesive layer.

13. The temporary edible flavored tattoo of claim 8 wherein said non-toxic edible ink comprises at least one non-powder flavoring selected from the group consisting of fructose, sucrose, saccharin, aspartame, ACE-K, and mixtures thereof.

14. The temporary edible tattoo of claim 8 wherein said varnish comprises said powder comprising at least one flavoring material.

15. The temporary edible favorable tattoo of claim 8 wherein said edible ink comprises a carrier selected from the group consisting of alcohol, water, soy and mixtures thereof.

* * * * *